R. R. KNOX.
EXPANSION BOLT.
APPLICATION FILED OCT. 14, 1913.
1,110,797.
Patented Sept. 15, 1914.
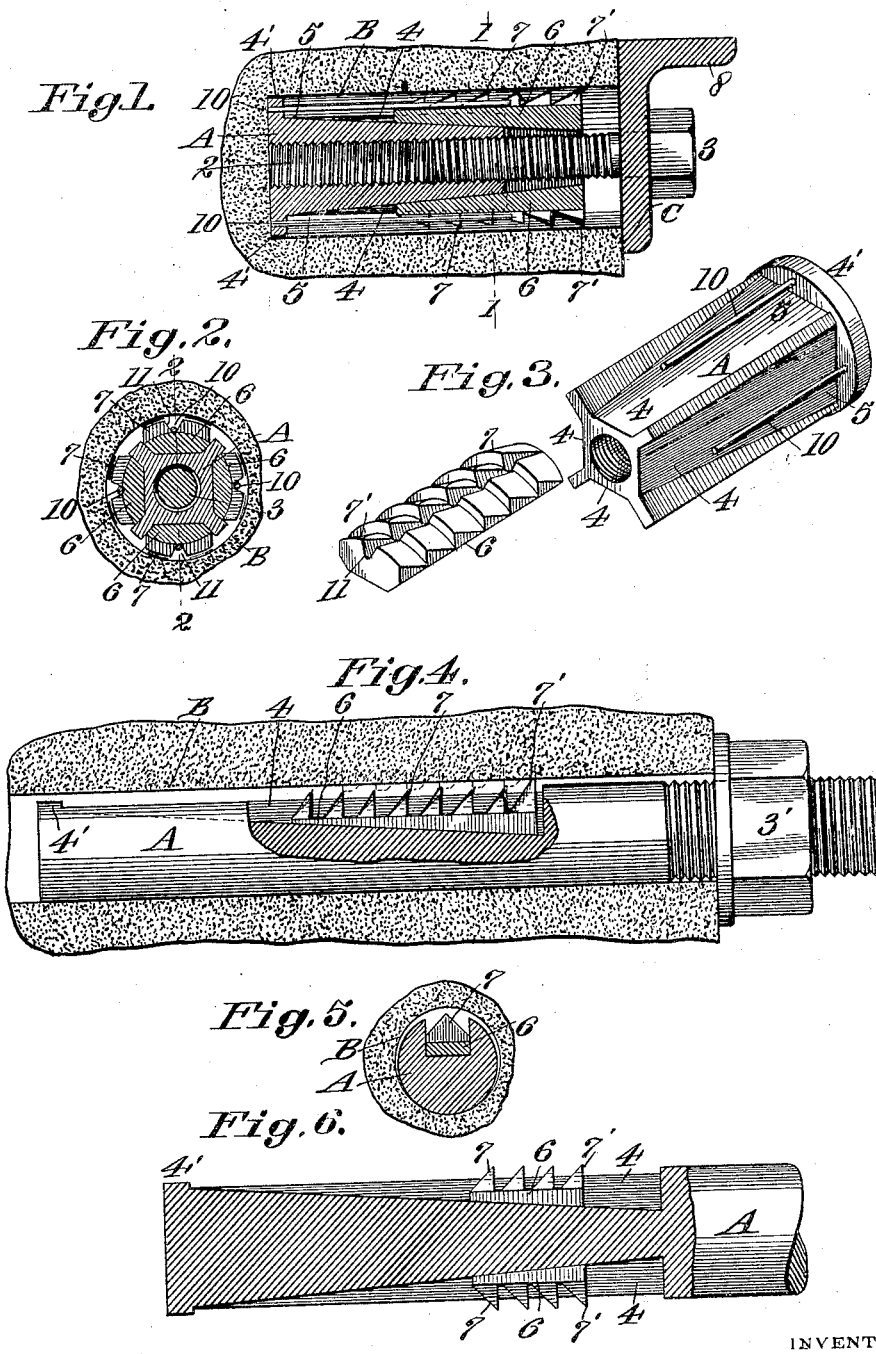
WITNESSES:
Charles Pickles
F. E. Maynard
INVENTOR
Robert R. Knox,
BY G. H. Strong
ATTORNEY

UNITED STATES PATENT OFFICE.

ROBERT R. KNOX, OF SAN FRANCISCO, CALIFORNIA.

EXPANSION-BOLT.

1,110,797. Specification of Letters Patent. Patented Sept. 15, 1914.

Application filed October 14, 1913. Serial No. 795,151.

*To all whom it may concern:*

Be it known that I, ROBERT R. KNOX, a citizen of the United States, residing in the city and county of San Francisco and State of California, have invented new and useful Improvements in Expansion-Bolts, of which the following is a specification.

This invention relates to an expansion bolt.

It is the object of this invention to provide a bolt which is adapted to be inserted in perforations formed in the materials to be bolted together and then be expanded so as to prevent its being withdrawn.

A further object is to provide an expansion bolt of the above character, which is simple in construction, economical in manufacture, efficient, strong and durable, and which is applicable for use in concrete and other masonry construction as well as in metal and timber constructions.

The invention consists of the parts and the construction and combination of parts as hereinafter more fully described and claimed, having reference to the accompanying drawings, in which,—

Figure 1 is a longitudinal section of the preferred form of the invention on the line 2—2 of Fig. 2. Fig. 2 is a cross section of same on the line 1—1 of Fig. 1. Fig. 3 is a perspective view of the expander and wedge. Fig. 4 is a view in elevation of modified form of the invention. Fig. 5 is a cross section of Fig. 4. Fig. 6 is a section of a further modification.

In the drawings, A represents the expander, which is here shown of suitable cross section, and is threaded a suitable distance, as at 2, to receive a complementary part 3.

The invention resides in forming longitudinally disposed grooves 4 on the shank A; these grooves 4 extending any suitable length thereon, preferably from one end to a point near the end of the bolt shank forming shoulders 4' and may be separated by corners or longitudinal ribs 4ª, Fig. 3. The bottoms of the grooves 4 are inclined from their outer ends toward the center or axial line of the expander, as indicated at 5 in Fig. 1, at any suitable degree of inclination. Slidably mounted in each groove 4 and removable therefrom is a wedge block 6, the bottom of which block is inclined to correspond to the inclination of the bottoms 5 of the grooves 4. Formed on the outer curved face of the block 6 is a series of teeth 7, the upper edges or points of which teeth are approximately in alinement with the periphery of the shank A, when the block 6 is disposed at its innermost position in the slots 4, as shown in Fig. 1, although the foremost tooth may project a short distance beyond the peripheral face of the shank A. The number of slots 4 and toothed blocks 6 employed on an expander A may be varied according to the size and the purpose for which it is to be applied; a single slot 4 and block 6 being employed, as shown in Fig. 4, in some instances; while in others it is desirable to provide a pair of opposed slots 4 and blocks 6, as shown in Fig. 6.

In the application of the invention a perforation B is formed in the parts to be joined together, of a diameter approximately equal to that of the shank A. The head end of the shank A is then inserted in the perforation so as to dispose the serrated or toothed block 6 therein. The actuating part 3 is then screwed on the threaded portion of the expander A so as to bear against a part 8, which is adapted to bear against the outer surface C of material in which the shank A is mounted. By turning the part or screw 3 the shank A will be caused to advance, which action causes the wedges 6 to move radially, as indicated in dotted lines in Fig. 4, in such a manner as to cause the teeth 7 thereon to dig into the wall of the perforation B in which the bolt is disposed. The outward movement of the wedges 6 at right angles to the expander A is caused by the wedge-like action of the inclined bottoms 5 of the slots 4. The setting of the teeth may be accomplished by moving the shank A toward the wall of the perforation B in such manner as to press the points, or one tooth as 7', against the surface of the perforation; the point of the tooth 7' projecting beyond the outer circumference of the shank A admitting of its being quickly engaged.

From the foregoing it will be seen that the more the part 3 is tightened, the tighter the toothed blocks 6 will be engaged with the material surrounding the expander and effectually prevent the body A being removed.

It is obvious that as many teeth or serrations 7 may be formed on the blocks 6 as desired; the fewer the teeth and the shorter the block, the greater the range of the outward movement of the blocks 6.

The expander shown in Figs. 1, 2 and 3 is of polygonal cross section with four, side, inclined channels terminating at their shallow ends at the shoulders 4', which prevent the wedges over-riding. In order to clamp the wedges 6 temporarily while being adjusted in the hole B, springs 10 are secured at the shoulder 4' and overlap the wedges which have curved outer teeth edges, these being divided at 11 for the spring end.

In Fig. 4 the expander is provided with external threads and a nut 3', while Fig. 1 shows a form with internal threads.

Having thus described my invention what I claim and desire to secure by Letters Patent, is:

1. An expansion bolt comprising an expander with inclined seats, wedges retained in said seats against side movement and slidable thereon, means for advancing the expander axially to spread the wedges when engaged by a contiguous fixed surface, and means attached to the expander for temporarily holding the wedges upon the expander.

2. An expansion bolt comprising an expander with inclined seats, wedges retained in said seats against side movement and slidable thereon, means for advancing the expander axially to spread the wedges when engaged by a contiguous fixed surface, and means attached to the expander for temporarily holding the wedges upon the expander, said latter means comprising springs free to overlap the wedges.

3. An expansion bolt comprising an expander with inclined seats, wedges retained in said seats against side movement and slidable thereon, means for advancing the expander axially to spread the wedges when engaged by a contiguous fixed surface, and means attached to the expander for temporarily holding the wedges upon the expander, said wedges having seats for springs.

4. An expansion bolt comprising a body part with inclined seats and corner ribs forming side walls of the seats, a plurality of wedges with arcuate surfaces substantially aggregating a circle encompassing the body part and being separated by the corner ribs, and means for advancing the body part.

5. An expansion locking device comprising an expander having longitudinally extending grooves therein, said grooves formed with inclined bottoms and having shoulders at the shallow ends of the grooves, removable tapered blocks slidable in said grooves, a series of teeth formed on the upper faces of said blocks with their outer ends terminating on a level with the outer periphery of the expander, locking teeth formed on the blocks with their outer ends projecting beyond the outer ends of the other teeth, threads formed on the expander and a complementary part fitted on the threads.

In testimony whereof I have hereunto set my hand in the presence of two subscribing witnesses.

ROBERT R. KNOX.

Witnesses:
JOHN H. HERRING,
W. W. HEALEY.

---

Copies of this patent may be obtained for five cents each, by addressing the "Commissioner of Patents, Washington, D. C."